United States Patent
Kasuya

(10) Patent No.: US 12,524,961 B2
(45) Date of Patent: Jan. 13, 2026

(54) INFORMATION PROCESSING APPARATUS, INFORMATION PROCESSING METHOD, AND COMPUTER-READABLE MEDIUM

(71) Applicant: CANON KABUSHIKI KAISHA, Tokyo (JP)

(72) Inventor: Nozomu Kasuya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 188 days.

(21) Appl. No.: 18/504,191

(22) Filed: Nov. 8, 2023

(65) Prior Publication Data
US 2024/0161394 A1 May 16, 2024

(30) Foreign Application Priority Data

Nov. 15, 2022 (JP) .................................. 2022-182798
Oct. 31, 2023 (JP) .................................. 2023-186954

(51) Int. Cl.
*G06T 17/00* (2006.01)
*G06T 7/00* (2017.01)
*G06T 7/70* (2017.01)
*G06V 10/54* (2022.01)
*H04N 13/279* (2018.01)

(52) U.S. Cl.
CPC ............ *G06T 17/00* (2013.01); *G06T 7/0002* (2013.01); *G06T 7/70* (2017.01); *G06V 10/54* (2022.01); *H04N 13/279* (2018.05); *G06T 2207/30168* (2013.01)

(58) Field of Classification Search
CPC ......... G06T 17/00; G06T 7/70; G06T 7/0002; G06T 2207/30168; H04N 13/279; G06V 10/54

USPC ........................................................ 345/419
See application file for complete search history.

(56) References Cited

U.S. PATENT DOCUMENTS

| | | | |
|---|---|---|---|
| 10,939,081 B2 | 3/2021 | Kasuya |
| 11,003,939 B2 | 5/2021 | Kasuya |
| 11,144,786 B2 | 10/2021 | Kasuya |
| 11,250,619 B2 | 2/2022 | Sakakima |

(Continued)

FOREIGN PATENT DOCUMENTS

| | | | |
|---|---|---|---|
| JP | 2001-291116 A | 10/2001 |
| JP | 2003-115042 A | 4/2003 |

(Continued)

OTHER PUBLICATIONS

Extended European Search Report issued by the European Patent Office on Apr. 22, 2024 in EP Patent Application No. 23209344.3, pp. 1-11.

(Continued)

*Primary Examiner* — Hai Tao Sun
(74) *Attorney, Agent, or Firm* — Carter, DeLuca & Farrell LLP

(57) ABSTRACT

An information processing apparatus is provided. Three-dimensional shape information indicating a three-dimensional shape of an object is acquired. The three-dimensional shape information is for generating a virtual viewpoint image of the object. Image quality of the object in a captured image of the object obtained by an image capturing apparatus is specified. Information indicating the image quality of the object and the three-dimensional shape information of the object are output.

19 Claims, 6 Drawing Sheets

(56) References Cited

U.S. PATENT DOCUMENTS

| | | | |
|---|---|---|---|
| 11,830,216 B2 | 11/2023 | Kasuya | |
| 2019/0279418 A1* | 9/2019 | Sakakima | G06T 15/20 |
| 2021/0263515 A1* | 8/2021 | Henry | G06T 17/00 |
| 2023/0245411 A1 | 8/2023 | Kasuya | |

FOREIGN PATENT DOCUMENTS

| | | |
|---|---|---|
| JP | 2003-337953 A | 11/2003 |
| JP | 2020-166652 A | 10/2020 |
| JP | 2021-033525 A | 3/2021 |
| WO | 2021/059669 A1 | 4/2021 |

OTHER PUBLICATIONS

Notice of Reasons for Refusal issued by the Japanese Patent Office on Jun. 10, 2024 in corresponding JP Patent Application No. 2022-182798, with English translation.

* cited by examiner

INFORMATION PROCESSING APPARATUS, INFORMATION PROCESSING METHOD, AND COMPUTER-READABLE MEDIUM

BACKGROUND

Field

The present disclosure relates to an information processing apparatus, an information processing method and a computer-readable medium, and more particularly to a technology for generating virtual viewpoint images.

Description of the Related Art

Technologies by which synchronous shooting is performed from multiple viewpoints by installing a plurality of image capturing apparatuses at different positions and a virtual viewpoint image is generated using images from multiple viewpoints obtained by such shooting have been attracting attention. By such technologies, it is possible to produce powerful content that includes images from viewpoints where image capturing apparatuses could not go in the past.

Such virtual viewpoint images can be generated by generating a three-dimensional model of the object based on the captured image group and shooting (i.e., rendering) this three-dimensional model with a virtual camera. Japanese Patent Laid-Open No. 2001-291116 proposes that, at the time of generating a virtual viewpoint image, an image captured by an image capturing apparatus close to a virtual viewpoint be selected and the color of the target object be determined depending on the viewpoint.

SUMMARY

According to an embodiment, an information processing apparatus comprises one or more memories storing instructions and one or more processors that execute the instructions to: acquire three-dimensional shape information indicating a three-dimensional shape of an object, wherein the three-dimensional shape information is for generating a virtual viewpoint image of the object; specify image quality of the object in a captured image of the object obtained by an image capturing apparatus; and output information indicating the image quality of the object and the three-dimensional shape information of the object.

According to another embodiment, an information processing apparatus comprises one or more memories storing instructions and one or more processors that execute the instructions to: acquire three-dimensional shape information indicating a three-dimensional shape of an object; and assign respective textures to a plurality of positions of the three-dimensional shape of the object indicated by the three-dimensional shape information, wherein the texture depends on image quality of each position in a captured image of the object obtained by an image capturing apparatus.

According to still another embodiment, an information processing apparatus comprises one or more memories storing instructions and one or more processors that execute the instructions to: acquire three-dimensional shape information indicating a three-dimensional shape of an object; and generate region information, wherein the region information indicates a region within a distance from the three-dimensional shape of the object indicated by the three-dimensional shape information, wherein the distance is set based on image quality of the object in a captured image of the object obtained by an image capturing apparatus.

According to yet another embodiment, an information processing method comprises: acquiring three-dimensional shape information indicating a three-dimensional shape of an object, wherein the three-dimensional shape information is for generating a virtual viewpoint image of the object; specifying image quality of the object in a captured image of the object obtained by an image capturing apparatus; and outputting information indicating the image quality of the object and the three-dimensional shape information of the object.

According to still yet another embodiment, a non-transitory computer-readable medium stores a program executable by a computer to perform a method comprising: acquiring three-dimensional shape information indicating a three-dimensional shape of an object, wherein the three-dimensional shape information is for generating a virtual viewpoint image of the object; specifying image quality of the object in a captured image of the object obtained by an image capturing apparatus; and outputting information indicating the image quality of the object and the three-dimensional shape information of the object.

Further features of the present disclosure will become apparent from the following description of exemplary embodiments (with reference to the attached drawings).

DESCRIPTION OF THE EMBODIMENTS

Figure 1:
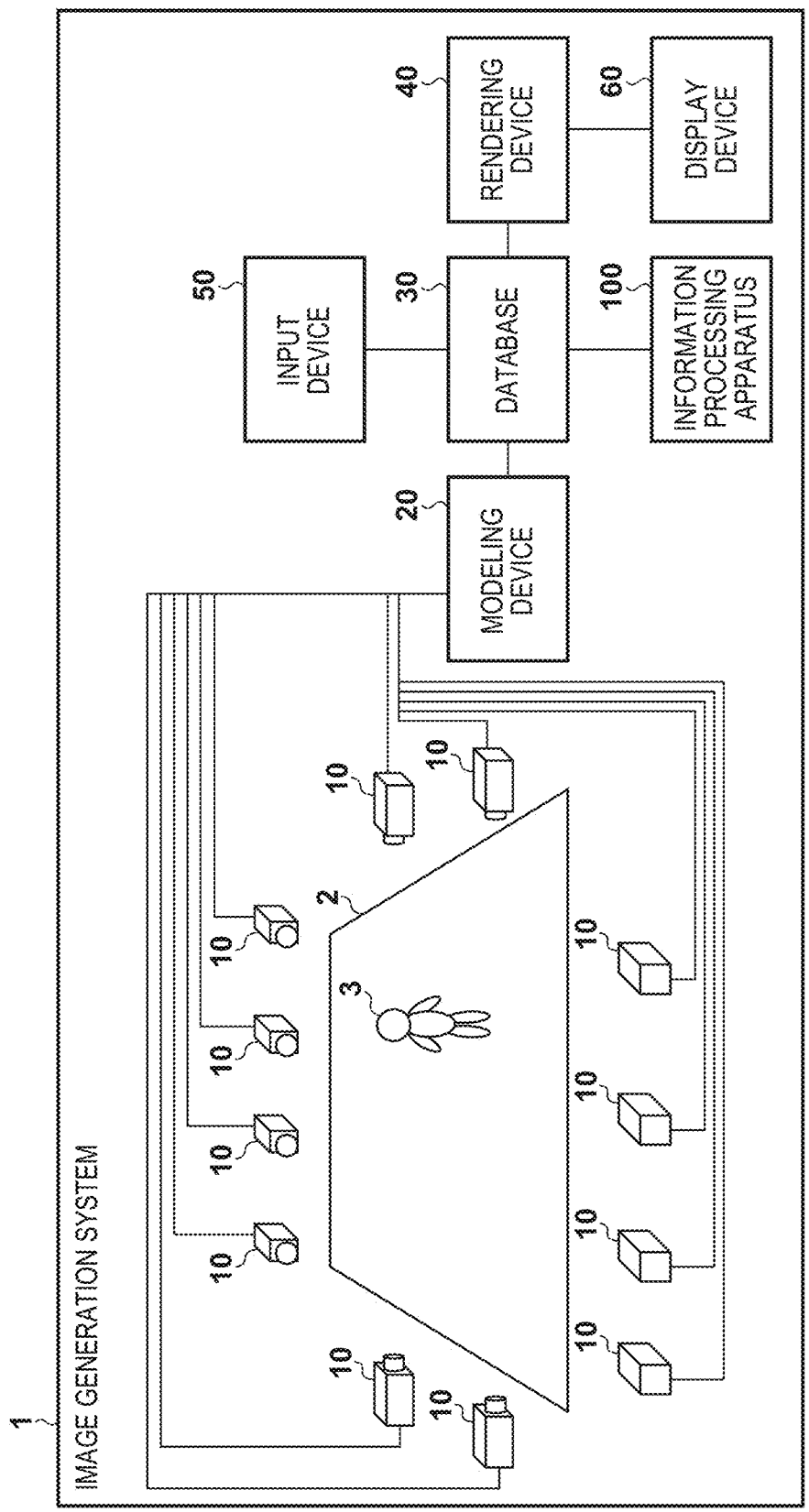
FIG. 1 is a diagram showing an example of a schematic configuration of an image generation system according to one embodiment.

Hereinafter, embodiments will be described in detail with reference to the attached drawings. Note, the following embodiments are not intended to limit the scope of the disclosure. Multiple features are described in the embodiments, but limitation is not made to require all such features, and multiple such features may be combined as appropriate. Furthermore, in the attached drawings, the same reference numerals are given to the same or similar configurations, and redundant description thereof is omitted.

When generating a virtual viewpoint image, the positions of viewpoints are determined such that a desirable virtual viewpoint image is obtained. At this time, it is also sought to determine the positions of the viewpoints such that a virtual viewpoint image with high image quality is obtained.

However, evaluating the image quality of the virtual viewpoint image at each viewpoint is not easy. For example, with a method for determining the color of the target object depending on the viewpoint, while it is possible to generate a high-definition virtual viewpoint image, a virtual viewpoint image needs to be generated in order to determine the final image quality. Thus, in order to generate a higher quality virtual viewpoint image, generation of a virtual viewpoint image and adjustment of virtual viewpoints need to be repeatedly performed. Moreover, in addition to processing time being required to generate a virtual viewpoint image, there is a problem in that a dedicated apparatus is generally used to generate virtual viewpoint images.

The present disclosure facilitates quality evaluation of an obtained virtual viewpoint image when setting a virtual viewpoint, in a technology for generating virtual viewpoint images.

An information processing apparatus according to one embodiment associates information indicating the image quality of an object in captured images of the object with three-dimensional shape information indicating a three-dimensional shape of the object. When generating a virtual viewpoint image based on captured images obtained by a plurality of image capturing apparatuses, an object in the virtual viewpoint image is generated based on the captured images of the object. Information indicating the image quality in the captured images of the object can thus be referred to as an indicator of the image quality of the virtual viewpoint image that is generated. In one embodiment, it is possible to roughly visualize the final image quality of a virtual viewpoint image on a general-purpose three-dimensional computer graphics (CG) tool, without using a dedicated image generation apparatus for generating virtual viewpoint images.

The information indicating the image quality of the object can conceivably take various forms. Hereinafter, first, a case where a texture is used as information indicating the image quality of the object will be described. In the following example, a texture that depends on the image quality at each position in a captured image of the object is assigned to a plurality of positions of the three-dimensional shape of the object.

FIG. 1 shows an example of an image generation system 1 for generating virtual viewpoint images. In the image generation system 1, an object 3 inside a shooting target area 2 is captured by a plurality of image capturing apparatuses 10. A virtual viewpoint image is then generated, based on the captured images obtained by the plurality of image capturing apparatuses 10. As shown in FIG. 1, for example, the plurality of image capturing apparatuses 10 are disposed so as to surround the object 3, and each capture an image of the shooting target area 2 from a different image capturing position. A modeling device 20 generates three-dimensional shape information indicating a three-dimensional shape of the object 3, using the captured images obtained by the image capturing apparatuses 10, and stores the generated three-dimensional shape information in a database 30. A rendering device 40 renders a virtual viewpoint image from a virtual viewpoint designated by an input device 50, using the three-dimensional shape information of the object that is stored in the database 30. A display device 60 displays the virtual viewpoint image generated by the rendering device 40.

An information processing apparatus 100 evaluates image quality as will be described later, using data stored in the database 30. The information processing apparatus 100 then outputs information indicating the evaluated image quality to the database 30. Here, the information processing apparatus 100 is able to output CG data that conforms to a general-purpose CG format and includes information indicating the evaluated image quality to the database 30. At this time, the user is able to designate a virtual viewpoint via the input device 50, while referring to information indicating the image quality output by the information processing apparatus 100. A general-purpose three-dimensional computer graphics (CG) tool may be operating in the input device 50. In this case, the input device 50 is able to generate a virtual viewpoint image from a specific viewpoint that conforms to the CG data output by the information processing apparatus 100 and display the generated virtual viewpoint image to the user. The user is able to designate a virtual viewpoint of the virtual viewpoint image to be generated by the rendering device 40, while viewing the virtual viewpoint image displayed by the input device 50.

Note that the plurality of image capturing apparatuses 10 can continuously perform synchronized image capture. In this case, the image generation system 1 is able to generate time-series three-dimensional shape information of the object, and is further able generate time-series virtual viewpoint images, that is, virtual viewpoint video. In such a configuration, the input device 50 is able to designate a virtual viewpoint whose position changes over time. A virtual viewpoint that moves in this way is also called a virtual camera path or camerawork.

Figure 2:
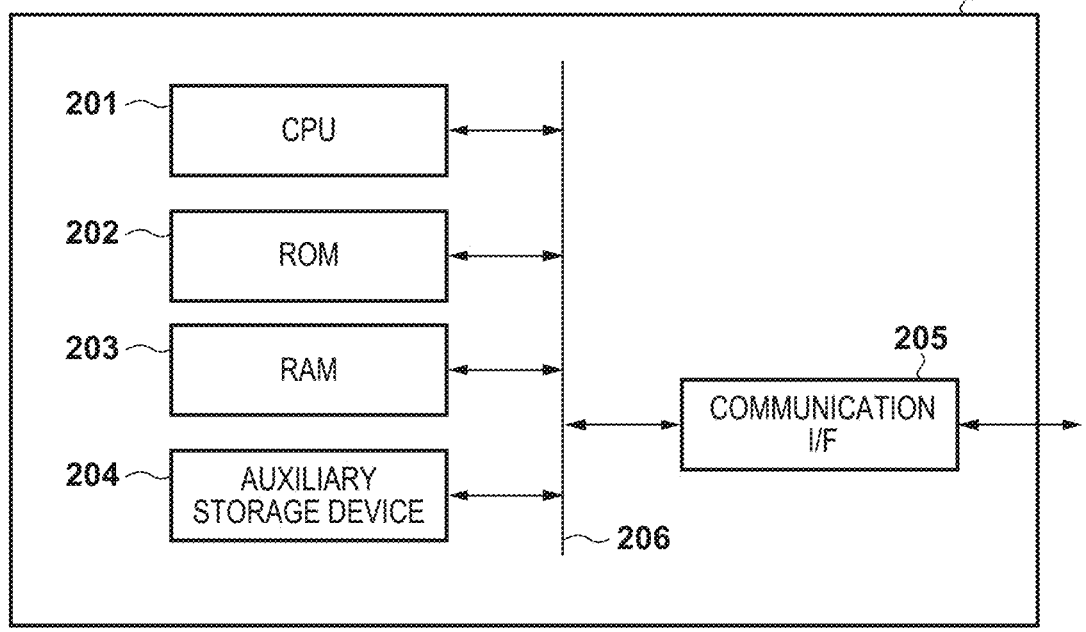
FIG. 2 is a diagram showing a hardware configuration example of an information processing apparatus according to one embodiment.

FIG. 2 is a block diagram showing a configuration example of hardware of a computer that is usable as the information processing apparatus 100 according to one embodiment. The information processing apparatus 100 includes a CPU 201, a ROM 202, a RAM 203, an auxiliary storage device 204, a communication I/F 205 and a bus 206. Note that the modeling device 20 and the input device 50 can also be realized using similar hardware. The information processing apparatus 100 may also be configured by a plurality of information processing apparatuses connected via a network. Furthermore, one or more of the modeling device 20, the rendering device 40 and the input device 50 may also be configured by a plurality of information processing apparatuses connected via a network.

The ROM 202 is a memory that stores programs and the like that do not need to be altered. The RAM 203 is a memory that temporarily stores programs or data supplied from the auxiliary storage device 204 and data supplied from outside via the communication I/F 205. The auxiliary storage device 204 stores various data such as image data or audio data. The auxiliary storage device 204 may be a storage such as a hard disk drive, for example. The communication I/F 205 is used for communication with a device external to the information processing apparatus 100. For example, in the case where the information processing apparatus 100 is connected to an external device in a wired manner, a communication cable is connected to the communication I/F 205. Also, in the case where the information processing apparatus 100 communicates wirelessly with an external device, the communication I/F 205 is provided with an antenna. The bus 206 connects the constituent elements of the information processing apparatus 100 and transmits information.

Figure 3:
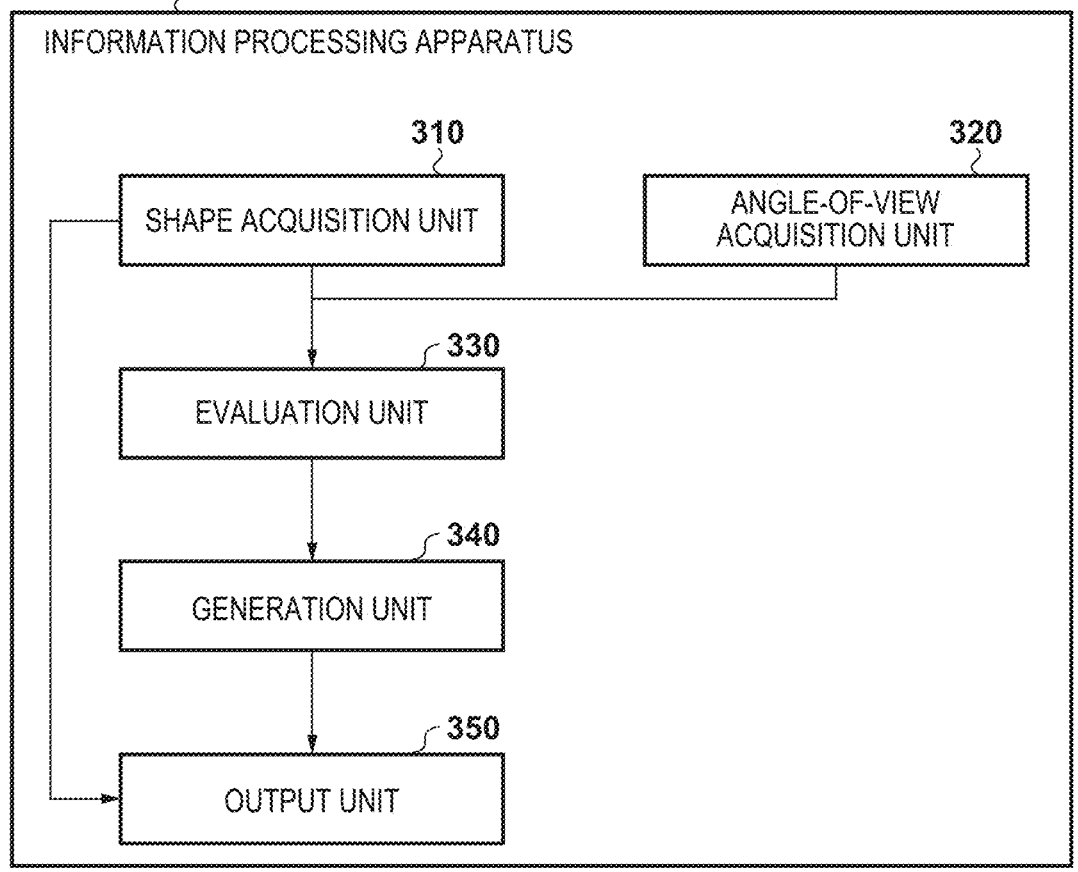
FIG. 3 is a diagram showing a functional configuration example of the information processing apparatus according to one embodiment.

In this way, a processor such as the CPU 201 performs overall control of the information processing apparatus 100 using computer programs or data stored in a memory such as the ROM 202 or the RAM 203. The respective functions of the processing units included in the information processing apparatus 100 shown in FIG. 3 are realized in this manner. Note that the information processing apparatus 100 may have one or a plurality of pieces of dedicated hardware different from the CPU 201. In this case, at least some of the processing that is performed by the CPU 201 can be performed by the dedicated hardware. Examples of dedicated hardware include an application-specific integrated circuit (ASIC), a field-programmable gate array (FPGA) and a digital signal processor (DSP). Also, the information processing apparatus 100 according to one embodiment may be realized by an information processing system that is configured by a plurality of information processing apparatuses connected via a network, for example.

FIG. 3 shows an example of the configuration of the information processing apparatus 100 according to the present embodiment. The information processing apparatus 100 includes a shape acquisition unit 310, an angle-of-view acquisition unit 320, an evaluation unit 330, a generation unit 340 and an output unit 350.

The shape acquisition unit 310 acquires three-dimensional shape information indicating a three-dimensional shape of the object. As described above, this three-dimensional shape information is used in order to generate a virtual viewpoint image of the object. The three-dimensional shape information that is acquired by the shape acquisition unit 310 may be three-dimensional shape information generated in the image generation system 1 or may be three-dimensional shape information prepared separately. Also, the shape acquisition unit 310 may acquire virtual three-dimensional shape information. In the case of using three-dimensional shape information prepared separately, transformation of the coordinate system, such as adjustment of scaling or position and orientation can be performed to be acceptable to the image generation system 1. Hereinafter, the case where the three-dimensional shape information is a mesh model will be described. However, the three-dimensional shape information is not limited to a mesh model, and may be other information indicating a three-dimensional shape such as point cloud data. Also, the three-dimensional shape information may be volume data that is represented by an aggregate of voxels.

The angle-of-view acquisition unit 320 acquires information indicating parameters of each of the plurality of image capturing apparatuses 10 in the image generation system 1. These parameters can include external camera parameters representing the position and orientation of the image capturing apparatus. These parameters can also include internal parameters indicating the focal length and the like of the image capturing apparatus. Hereinafter, the parameters of the image capturing apparatuses 10 that are acquired by the angle-of-view acquisition unit 320 will be referred to as angle-of-view information. This angle-of-view information can indicate the angle of view or the image capturing range of the image capturing apparatus.

The evaluation unit 330 specifies the image quality of the object in the captured images of the object obtained by the image capturing apparatuses 10. The evaluation unit 330 is able to evaluate the image quality of each of a plurality of positions of the object in the captured images of the object obtained by the image capturing apparatuses 10. Here, the evaluation unit 330 is able to determine the resolution of the object in the captured images of the object obtained by the image capturing apparatuses 10. The evaluation unit 330 is able to determine the resolution, in accordance with the angle-of-view information acquired by the angle-of-view acquisition unit 320. The evaluation unit 330 is able to perform such evaluation of the image quality for the captured images obtained by each of the plurality of image capturing apparatuses 10. This enables the evaluation unit 330 to determine the resolution at which specific positions of the object appear in each image capturing apparatus. The evaluation unit 330 is then able to evaluate the image quality of the object based on the determined resolution. The evaluation unit 330 is able to perform such evaluation for each position of the object. In the embodiment described below, the evaluation unit 330 performs such evaluation on each surface of the mesh model representing the three-dimensional shape of the object. The image quality thus evaluated is thought to approximate the image quality of a specific position of the object in the virtual viewpoint image generated by the rendering device 40.

The generation unit 340 generates information indicating the image quality of the object, in accordance with the image quality evaluation result obtained by the evaluation unit 330. The generation unit 340 is able to generate information indicating the image quality of the object for each of a plurality of positions of the object. Here, the generation unit 340 is able to generate information indicating the image quality of the object, based on the image quality of the object in the captured images obtained by each of the plurality of image capturing apparatuses 10. Also, the generation unit 340 is able to generate visualized information indicating the image quality of the object. The visualized information may be image information or shape information, for example. For example, information indicating the image quality of the object that is generated by the generation unit 340 may be texture information of a three-dimensional model or shape information of a three-dimensional model.

In the case of the present embodiment, the generation unit 340 generates texture information indicating the texture of the three-dimensional model, as information indicating the image quality of the object. The generation unit 340 is able to generate a texture that depends on the image quality of the object. In one embodiment, the texture includes repetition of an element. This element can be any image. In this way, a repetitive pattern can be used as the texture. The size of the element is then selected according to the image quality of the object. In the following embodiment, the scale of the repetitive pattern is changed based on the image quality evaluation value.

The output unit 350 outputs information indicating the image quality of the object and three-dimensional shape information of the object. The output unit 350 may output information indicating the image quality of the object, in association with the three-dimensional shape information. The output unit 350 is able to output information indicating the image quality of each of a plurality of positions of the object, in association with the three-dimensional shape information. Also, the output unit 350 is able to output visualized information indicating the image quality of the object. The output unit 350 is, for example, able to output image information such as a texture generated by the generation unit 340, in association with the three-dimensional shape information acquired by the shape acquisition unit 310. Here, the output unit 350 may output information representing a three-dimensional model that is based on the information indicating the image quality of the object. For example, the data that is output by the output unit 350 may be data that conforms to a general-purpose format. Data that conforms to a general-purpose format is data having both three-dimensional shape information and texture data, such as PLY data or a combination of OBJ data and MTL data, for example. The output unit 350 may be a display unit that displays information indicating the image quality of the object in association with the three-dimensional shape information. The output unit 350 may also be a functional unit that outputs information to an external device.

Figure 4:
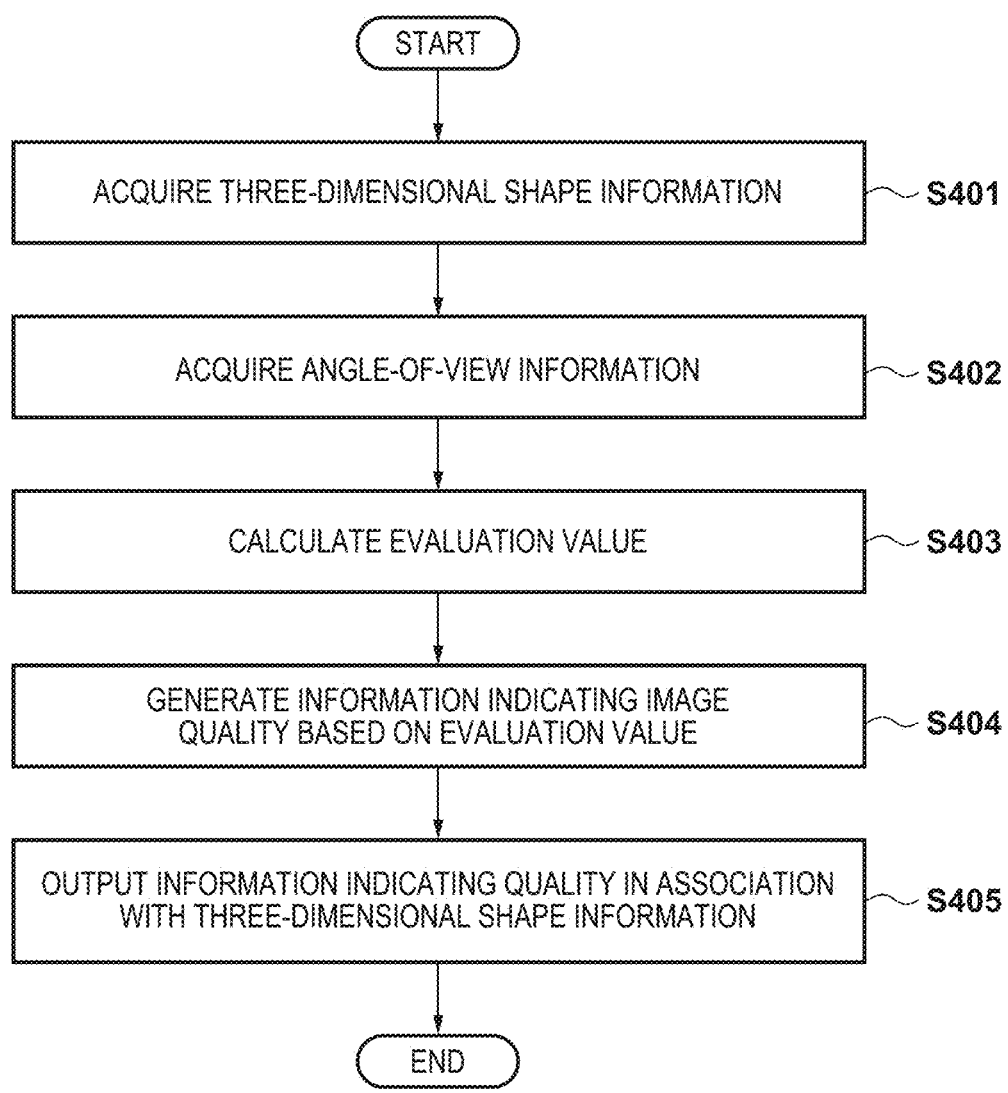
FIG. 4 is a diagram showing an example of a flowchart of an information processing method according to one embodiment.

FIG. 4 is a flowchart of an information processing method that is performed by the information processing apparatus 100 according to one embodiment. Image quality is evaluated by performing processing in accordance with FIG. 4. The processing shown in FIG. 4 can be realized by the CPU 201 executing a control program stored in the ROM 202 and read out to the RAM 203.

In step S401, the shape acquisition unit 310 acquires three-dimensional shape information. The shape acquisition unit 310 may load a three-dimensional shape information file stored in the database 30. The shape acquisition unit 310 may also receive three-dimensional shape information via a network. The shape acquisition unit 310 may also generate three-dimensional shape information, by estimating the three-dimensional shape of the object based on the captured images of the object obtained by the image capturing apparatuses 10. In this case, the shape acquisition unit 310 is able to generate a three-dimensional shape of the object using the captured images of the object obtained by the plurality of image capturing apparatuses 10, based on a visual hull method or the like.

In step S402, the angle-of-view acquisition unit 320 acquires angle-of-view information of the plurality of image capturing apparatuses 10. The angle-of-view acquisition unit 320 is able to acquire angle-of-view information of all the image capturing apparatuses 10 of the image generation system 1.

Figure 5:
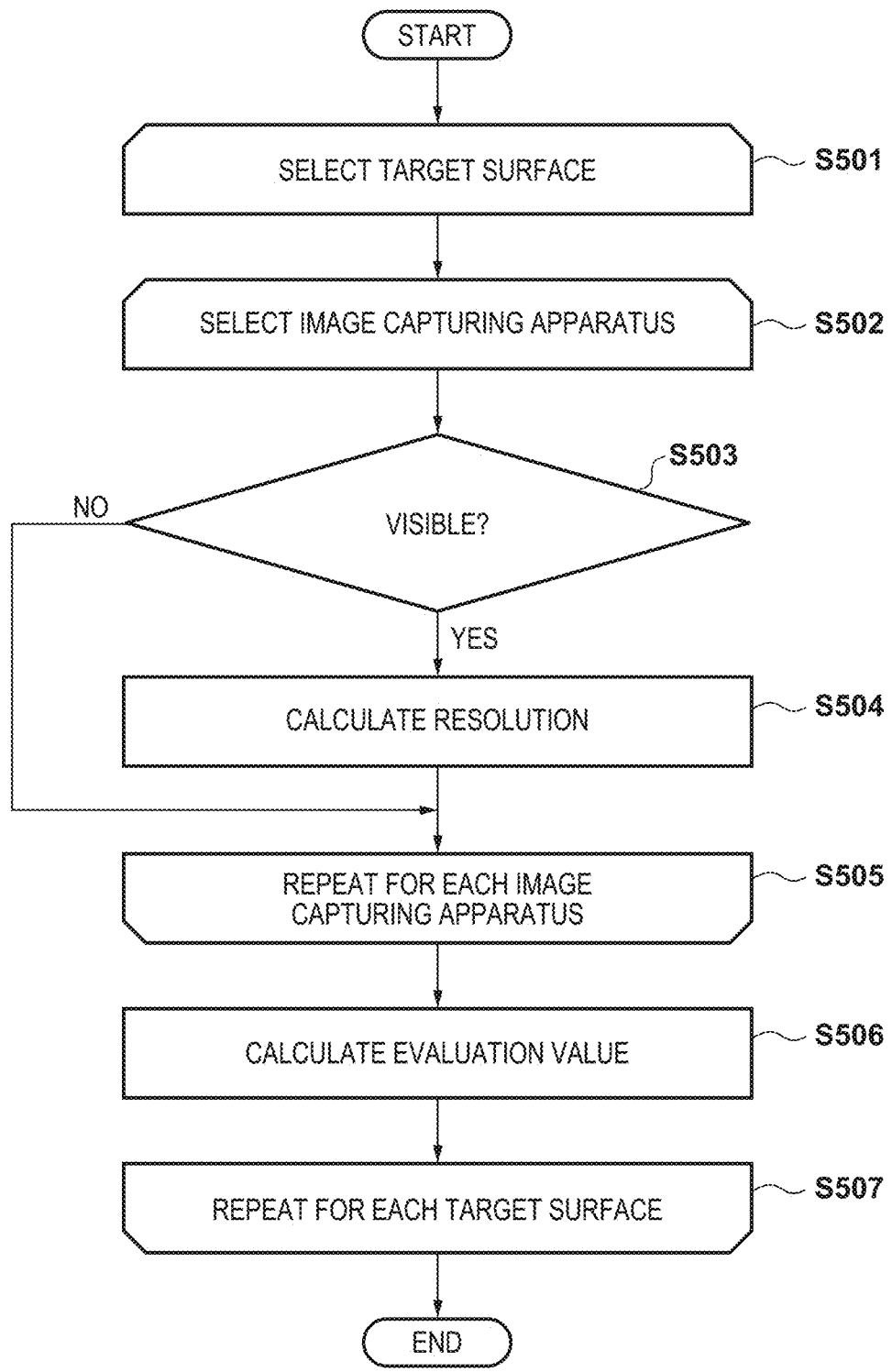
FIG. 5 is a diagram illustrating an example of a flowchart of an image quality evaluation method according to one embodiment.

In step S403, the evaluation unit 330 calculates an image quality evaluation value for each of a plurality of positions of the object, based on the three-dimensional shape information acquired in step S401 and the angle-of-view information acquired in step S402. The evaluation unit 330 is able to calculate an evaluation value indicating the resolution of the captured images for a specific position of the object. FIG. 5 shows an example of a processing flow for performing such image quality evaluation for each of the plurality of surfaces representing the three-dimensional shape.

In step S501, the evaluation unit 330 selects a surface for which an evaluation value has not been calculated, among the surfaces of a mesh model serving as the three-dimensional shape information. An evaluation value is calculated for a target surface selected in step S501 by the following processing. By repeatedly performing the processing of steps S501 to S505, evaluation values are calculated for all surfaces of the mesh model of the object. Note that the evaluation unit 330 may subdivide one surface before starting processing in accordance with FIG. 5. With such a configuration, image quality can be evaluated more precisely, assuming that the image quality varies within one surface due to the surface being large.

In step S502, the evaluation unit 330 selects an image capturing apparatus that has not been targeted for evaluation of image quality relating to the target surface, from among the plurality of image capturing apparatuses 10.

In step S503, the evaluation unit 330 determines whether the target surface selected in step S501 is visible from the image capturing apparatus selected in step S502. When the target surface is not visible, such as when the target surface is hidden by another surface of the mesh model, for example, the processing transitions to step S505. When the target surface is visible, the processing transitions to step S504. In determining whether or not the target surface is visible, a method that utilizes distance information from the target surface to the image capturing apparatus can be used. For example, whether or not the target surface is visible may be determined by the following method. First, the distance between the three-dimensional position of the target surface and the three-dimensional position of the image capturing apparatus is calculated. Meanwhile, pixel values of pixels corresponding to the target surface in a depth map indicating the distance from the image capturing apparatus to the nearest part of the object are acquired. The difference between the calculated distance from the three-dimensional position of the target surface to the three-dimensional position of the image capturing apparatus and the distance indicated by the pixel values of the pixels corresponding to the target surface in the depth map is then calculated. If the calculated difference is less than or equal to a threshold value, it is determined that the target surface is visible. Also, if the calculated difference is greater than the threshold value, it is determined that the target surface is not visible (cannot be seen).

In step S504, the evaluation unit 330 calculates the resolution of a specific position of the object corresponding to the target surface in the captured image obtained by the image capturing apparatus selected in step S502. The resolution can be calculated based on the angle-of-view information of the image capturing apparatus and the position of the target surface. Also, the resolution can be represented by the physical size of the specific position of the object per pixel of the captured image. For example, where the position of the target surface is Xt, the position of the target image capturing apparatus is Xc, and the focal length is f (pix), a resolution r (mm/pix) can be calculated in accordance with the following equation. In the following equation, $\sqrt{(Xt-Xc)^2}$ represents the distance between Xt and Xc.

$$r[\text{mm/pix}] = \sqrt{(Xt-Xc)^2}/f$$

In step S505, if there is an image capturing apparatus that has not been targeted for evaluation of image quality relating to the target surface, the processing returns to step S502. When the image qualities obtained by all of the image capturing apparatuses have been evaluated in relation to the target surface, the processing transitions to step S506. In this way, the processing of steps S502 to S505 is repeatedly performed for each image capturing apparatus.

In step S506, the evaluation unit 330 determines the evaluation value of the target surface, based on the resolution calculated for each of the plurality of image capturing apparatuses 10 in step S504 in relation to the target surface. As an example, the evaluation unit 330 is able to use the highest resolution, among the resolutions calculated for the plurality of image capturing apparatuses 10, as the evaluation value of the target surface. This enables the evaluation unit 330 to determine an evaluation value indicating the image quality (resolution in this example) of a specific position of the object in the captured images of the object obtained by the image capturing apparatuses 10. In step S503, image capturing apparatuses from which the specific position of the object is visible are selected from the plurality of image capturing apparatuses 10. Accordingly, in step S506, the image quality of the specific position of the object is evaluated, based on the captured image of the object obtained by the selected image capturing apparatus.

In a viewpoint-dependent rendering method that determines the color of the target object depending on the viewpoint, coloring of a specific position of a three-dimensional shape is performed by projecting the captured images obtained by image capturing apparatuses from which the specific position is visible. Thus, the image quality of the captured images obtained by the image capturing apparatuses from which the specific position is visible is related to the image quality of the virtual viewpoint image that is finally obtained. Also, the best image quality for the specific position of the virtual viewpoint image is determined by the image quality of the captured image having the highest image quality among the captured images obtained by the plurality of image capturing apparatuses. The evaluation value determined in the above manner can thus be used in order to evaluate the image quality for a specific position (i.e., target surface) of the virtual viewpoint image.

The method for determining the evaluation value is not limited to the above method. Any indicator indicating image quality when a virtual viewpoint image is rendered can be used. For example, the evaluation value may be a statistical value such as an average value or a median value of the resolutions calculated for the plurality of image capturing apparatuses 10. Furthermore, when calculating a statistical value, the resolution may be weighted, based on the angle between the normal of the specific position (e.g., target surface) and the optical axis of the image capturing apparatus corresponding to the resolution. For example, the weight can be increased as the angle between the above normal and optical axis decreases.

In step S507, if there is a surface for which an evaluation value has not been calculated, among the surfaces of the mesh model serving as the three-dimensional shape information, the processing returns to step S501. If there is no surface for which an evaluation value has not been calculated, calculation of evaluation values in accordance with FIG. 5 ends. In this way, the processing of steps S501 to S507 is repeatedly performing for each surface. Note that, in the case where the three-dimensional shape information is a point cloud, an evaluation value may be calculated for each point, or an evaluation value may be calculated for each region composed of a number of points, among the plurality of points constituting the point cloud. Similarly, in the case where the three-dimensional shape information is volume data composed of voxels, an evaluation value may be calculated for each voxel, or an evaluation value may be calculated for each group composed of a number of voxels.

Figure 6A:
FIGS. 6A and 6B show an example of a texture that is assigned to three-dimensional shape information.
Figure 6B:
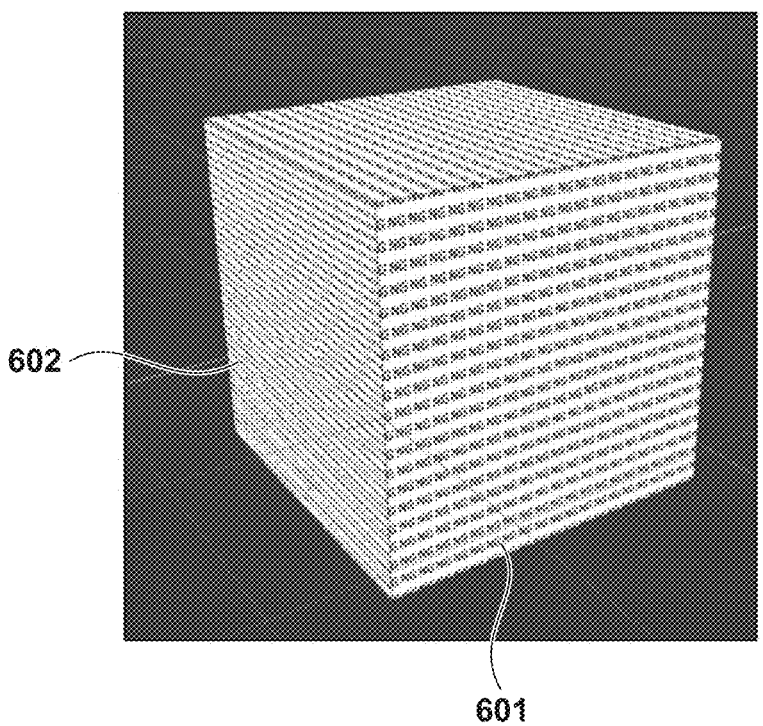

In step S404, the generation unit 340 generates a texture that depends on the image quality of each of the plurality of positions of the object, based on the evaluation values calculated by the evaluation unit 330. The generated texture is used as an indicator of image quality. FIG. 6A shows an example of an element included in a texture, and FIG. 6B shows an example of a mesh model to which the texture is assigned. For simplicity of description, FIG. 6B shows a mesh model of a cube, but the three-dimensional shape is not limited to a cube.

The texture includes a pattern which is a repetition of an element such as is shown in FIG. 6A. The element shown in FIG. 6A is an image containing the characters "NG". In the present embodiment, the generation unit 340 generates a texture including elements of a size that follows the evaluation value. Here, the texture includes smaller elements as the evaluation value increases, and the texture includes larger elements as the evaluation value decreases. For example, the generation unit 340 is able to generate such a texture by scaling the texture coordinates at a magnification that follows the following equation. The weight can be set to an appropriate value.

Magnification=Weight/Evaluation Value

The generation unit 340 is able to generate, for each position of the three-dimensional shape of the object indicated by the three-dimensional shape information, information indicating the image quality of this position. For example, the generation unit 340 is able to generate a texture that depends on the evaluation value for each surface of the mesh model.

In step S405, the output unit 350 outputs three-dimensional shape information and information indicating the image quality of the object. The output unit 350 is able to output the information indicating the image quality of the object in association with the three-dimensional shape information. Also, the output unit 350 is able to associate information indicating the image quality of each position generated by the generation unit 340 with this position in the three-dimensional shape of the object indicated by the three-dimensional shape information.

For example, the output unit 350 is able to output three-dimensional shape information indicating the three-dimensional shape of the object and the texture assigned to each of the plurality of positions of the three-dimensional shape of the object. In the present embodiment, the output unit 350 assigns the texture generated by the generation unit 340 in step S404 to the three-dimensional shape information acquired by the shape acquisition unit 310 in step S401. Specifically, the output unit 350 is able to assign a texture that depends on the image quality of each position in the captured images of the object obtained by the image capturing apparatuses to a plurality of positions of the three-dimensional shape of the object indicated by the three-dimensional shape information. For example, the output unit 350 is able to map a texture that depends on the evaluation value generated by the generation unit 340 on each surface of the mesh model. As described above, the output unit 350 is able to output three-dimensional shape information and information indicating the image quality of the object as CG data that conforms to a general-purpose format.

The CG data output by the output unit 350 in this way is displayed as shown in FIG. 6B by a general-purpose CG tool. A surface 601 is a surface having a low evaluation value, and a texture that includes large-size elements is mapped thereon. On the other hand, a surface 602 is a surface having a high evaluation value, and a texture that includes small-size elements is mapped thereon.

As described above, the user is able to designate a virtual viewpoint of the virtual viewpoint image using the input device 50 or the like. The information processing apparatus 100, the input device 50 or another device may have a display control unit (not shown) that causes a display device such as the display device 60 to display a three-dimensional shape of the object that conforms to the three-dimensional shape information and information indicating the image quality of the object output by the output unit 350. Also, the information processing apparatus 100, the input device 50 or another device may have a reception unit (not shown) that receives designation of the virtual viewpoint corresponding to the virtual viewpoint image from the user. Such a configuration enables the user to designate the virtual viewpoint while checking the information indicating the image quality of the object. The rendering device 40 then generates a virtual viewpoint image, based on the captured images of the object, the three-dimensional shape information, and the designated virtual viewpoint.

For example, a camerawork creator of the virtual viewpoint image is able to create camerawork while referring to textured CG data output by the output unit 350. The camerawork creator is thus able to know at the time of camerawork creation whether or not the final image quality of the virtual viewpoint image seen from a specific virtual viewpoint will break down. In this way, according to the present embodiment, quality evaluation of the virtual viewpoint image that is obtained can be easily performed when setting the virtual viewpoint.

Specifically, if the elements of the texture are visible when viewing the three-dimensional model from a virtual viewpoint at a position that follows the created camerawork, the final image quality will likely break down. On the other hand, if the elements on the texture are not visible, the image quality is likely be to be secured. For example, in FIG. 6B, since the character "NG" cannot be read from the texture of the surface 602, the image quality of the surface 602 of the virtual viewpoint image is likely to be sufficient. However, since the characters "NG" can be read from the texture of the surface 601, the image quality of the surface 601 of the virtual viewpoint image will possibly break down. In this case, the camerawork creator can change the camerawork so as to move the virtual viewpoint away from the surface 601 such that the image quality is secured, to widen the field of view by changing focal length, or to move the virtual viewpoint toward the surface 602. In this way, by using information indicating the image quality of the object output by the information processing apparatus 100, the virtual viewpoint can be easily set such that the image quality of the virtual viewpoint image will not break down, without rendering a virtual viewpoint image.

Figure 7A:
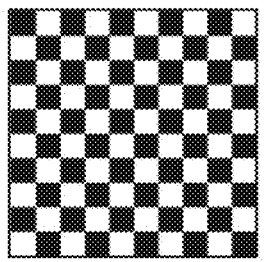
FIGS. 7A and 7B show an example of a texture that is assigned to three-dimensional shape information.
Figure 7B:
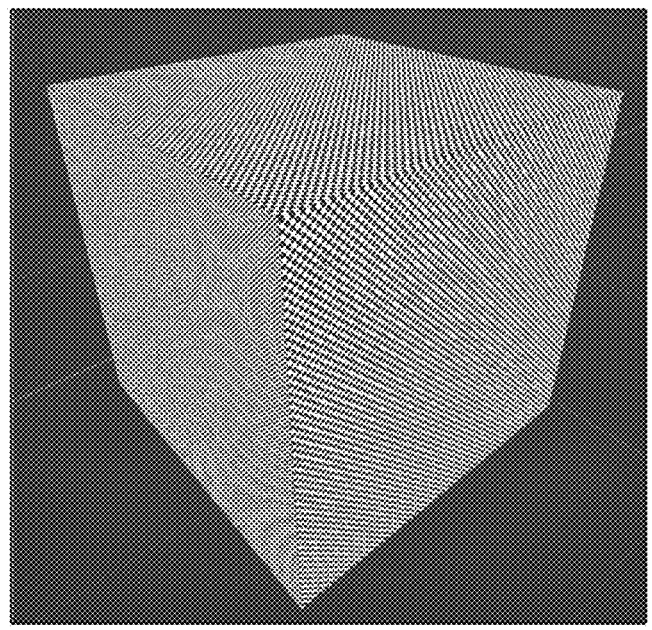

The texture generated by the generation unit 340 in step S404 need not be an image such as is shown in FIGS. 6A and 6B. Any texture that helps the user to judge the image quality can be used. While the characters "NG" is used in FIGS. 6A and 6B, "No good" can also be used. Furthermore, any texture can be used such that a user can judge whether the user can see the texture. In addition, for example, a texture having a grid pattern as elements can be used. FIG. 7A shows an example of a texture having a grid pattern. Also, FIG. 7B shows an example of a three-dimensional model to which the texture is assigned. In this case, the grid pattern becomes smaller as the evaluation value increases, and the grid pattern becomes larger as the evaluation value decreases. Thus, in the case where image quality can be secured, the grid pattern becomes difficult to see due to looking like moiré. On the other hand, the user is able to know that in places where the grid can be clearly seen the image quality is not secured. The texture to be used is not limited to these examples. Any texture can be used such that image quality can be judged based on how the texture on the three-dimensional model is seen.

The case where textures are used as information indicating image quality has been described above. By assigned a texture to the three-dimensional shape information, the user is able to judge whether the final image quality of the virtual viewpoint image will be acceptable, based on the visibility of the texture. On the other hand, the information indicating the image quality of the object may be region information indicating a region set around the three-dimensional shape of the object. The size of such a region can be set according to the image quality of the object. For example, information indicating a region within a predetermined distance from the object can be assigned to the three-dimensional shape, with the predetermined distance being shortener as the image quality of the object increases. Information indicating such a region can be used in order to for the user to know the range in which image quality can be secured.

In the following example, a region is set around each of a plurality of positions of the three-dimensional shape of the object. Here, the region set around a specific position of the three-dimensional shape of the object is set according to information indicating the image quality for the specific position in captured images of the object obtained by the image capturing apparatuses. The virtual viewpoint being inside this region indicates that the image quality of the virtual viewpoint image for the specific position will likely break down, and the virtual viewpoint being outside this area indicates that the image quality of the virtual viewpoint image for the specific position is likely to be secured.

Also, the region that is set around the three-dimensional shape of the object may be a region that includes the respective regions set around the plurality of positions of the three-dimensional shape of the object (e.g., a union of regions) as described above. Information indicating such an inclusion region, such as three-dimensional model information, for example, may be assigned to the three-dimensional shape information of the object. A region in which the quality of the virtual viewpoint image is not secured or a region in which the quality is secured can be distinguished, in accordance with such three-dimensional model information. By using such information, it is possible to uniformly judge the image quality of a virtual viewpoint image.

In such a modification, the evaluation unit 330 is further able to acquire information indicating the focal length of the virtual viewpoint. A focal length acquisition unit (not shown) may acquire information indicating the focal length of a virtual viewpoint (or virtual camera) from the user. The focal length acquisition unit (not shown) may also acquire information indicating the focal length of a designated virtual viewpoint from the input device 50.

If the focal length of the virtual viewpoint is long, the resolution of the object in the captured image, which is required in order to secure the image quality of the virtual viewpoint image, will be high, even if the virtual camera is at a large distance from the object. On the other hand, if the focal length of the virtual viewpoint is short, the resolution of the object in the captured image, which is required in order to secure the image quality of the virtual viewpoint image, will be low, since a wide-angle image is obtained. In view of this, the size of the region that is set around the three-dimensional shape of the object in this modification can be further set according to the focal length of the virtual viewpoint corresponding to the virtual viewpoint image. In this way, a three-dimensional model indicating a region in which the image quality of the virtual viewpoint image is not secured is generated, according to the focal length of the virtual viewpoint. Since this region changes according to the focal length of the virtual viewpoint, the evaluation unit 330 acquires an approximate focal length in advance in this modification. It is, however, not essential for the evaluation unit 330 to acquire the focal length. For example, the evaluation unit 330 may generate information indicating the image quality of the object based on a predetermined value of the focal length.

Figure 8:
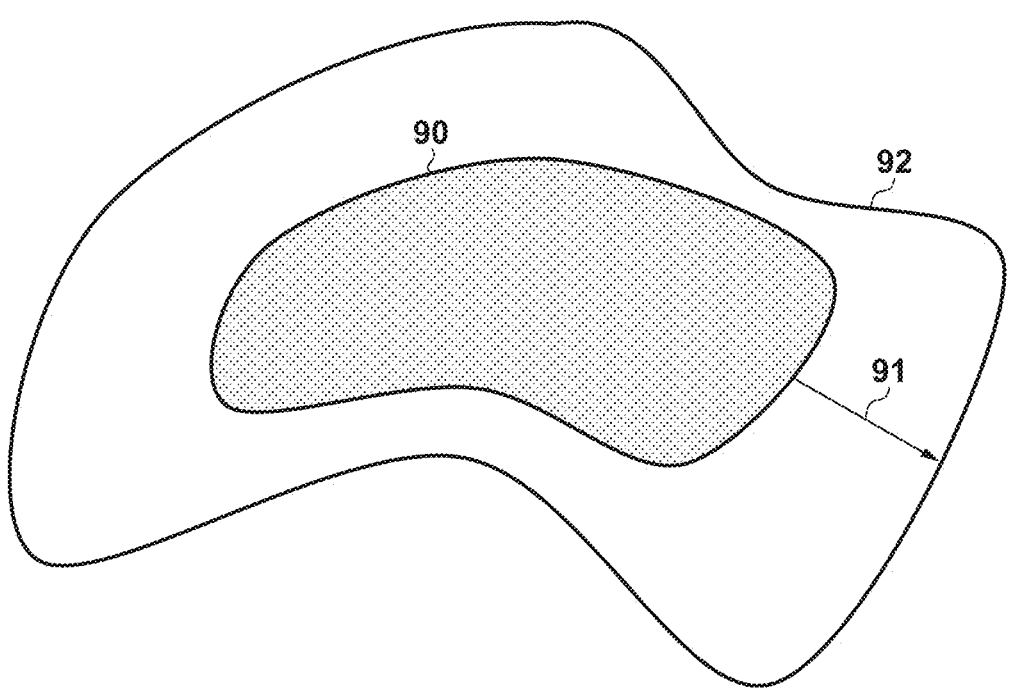
FIG. 8 is a diagram illustrating a region in which image quality is secured.

The generation unit 340 calculates, for each position of the object, the distance at which the image quality is secured, based on the evaluation value determined by the evaluation unit 330 and the focal length of the virtual viewpoint. Also, the generation unit 340 generates a three-dimensional model indicating a region in which the quality of the virtual viewpoint image is not secured, based on the calculated distance. FIG. 8 is a schematic diagram illustrating an example of such a model. In FIG. 8, a region 90 indicating the three-dimensional shape of the object is shown. The generation unit 340 calculates, for each position of the object (e.g., each target surface), a distance 91 at which the image quality is secured. For example, the generation unit 340 is able to calculate the distance 91 by distance $d = \alpha \cdot e \cdot f$. Here, the image quality evaluation value e (mm/pix) is the evaluation value of a target surface calculated similarly to step S506. Also, the focal length f (pix) is the focal length of the virtual viewpoint. The weight α can be set to an appropriate value.

The generation unit 340 is, in this way, able to determine a region within the distance 91 calculated for each position, from the positions (e.g., target surfaces) of the object. The generation unit 340 is then able to determine a region 92 that includes the region determined for each position as a region in which image quality is not secured. The virtual viewpoint being inside the region 92 indicates that the image quality of the virtual viewpoint image could possibly break down. The generation unit 340 is able to generate a three-dimensional model indicating the region thus determined. This three-dimensional model may be a semitranslucent model, for example.

The output unit 350 is able to output three-dimensional shape information indicating a three-dimensional shape of the object and a three-dimensional shape indicating a region set around the three-dimensional shape of the object. For example, the output unit 350 is able to output the three-dimensional model thus generated in association with the three-dimensional shape information of the object. As an example, the output unit 350 is able to output CG data that conforms to a general-purpose format and includes both the three-dimensional model of the object and the semitranslucent model generated by the generation unit 340.

The CG data output by the output unit 350 in this way is displayed as shown in FIG. 6B by a general-purpose CG tool. The surface 601 is a surface having a low evaluation value, and a texture that includes large-size elements is mapped thereon. On the other hand, the surface 602 is a surface having a high evaluation value, and a texture that includes small-size elements is mapped thereon.

The user is able to designate a virtual viewpoint, in accordance with information indicating a region in which the quality of the virtual viewpoint image is not secured, such as the semitranslucent model described above. Designating a virtual viewpoint such that the image quality of the virtual viewpoint image is secured is thus facilitated. For example, a camerawork creator of the virtual viewpoint image is able to operate a virtual camera while viewing CG data output by the output unit 350. At this time, the region 92 is not visible from the virtual camera when the virtual camera enters the region 92. Also, the region 92 is visible from the virtual camera when the virtual camera is outside the region 92. Accordingly, by operating the virtual camera such that the region 92 is visible, it is possible to create camerawork such that the image quality of the virtual viewpoint image is secured.

Information indicating the image quality of the object is not limited to that described above. For example, information indicating the image quality of the object need not be information that is visualized as a three-dimensional model (e.g., textures or semitranslucent model). For example, the output unit 350 may output information indicating the image quality of the object in association with three-dimensional shape information as meta information. Such information indicating the image quality of the object may be, for example, the above resolution r for each image capturing apparatus on each surface of the object, the above evaluation value for each surface of the object, or the distance 91 at which the image quality is secured for each surface of the object.

In this case, a device (e.g., a camerawork production device) for designating a virtual viewpoint such as the input device 50 may have similar functions to the generation unit 340. For example, this device may display information (e.g., textures or semitranslucent model) indicating the image quality of the object to the user together with a three-dimensional model, in accordance with meta information. On the other hand, this device may determine whether the image quality is secured in the virtual viewpoint image from the designated virtual viewpoint, in accordance with meta information, and notify the determination result to the user. For example, this device is able to determine whether the image quality of the virtual viewpoint image is secured, based on the distance from the virtual viewpoint to each surface of the object and the distance 91 at which the image quality is secured for each surface of the object shown in the meta information.

Note that, even in the case where the shape acquisition unit 310 acquires three-dimensional shape information other than a mesh model, the output unit 350 is able to associate information indicating the image quality of the object with the three-dimensional shape information. For example, in the case where the shape acquisition unit 310 acquires point cloud data, the generation unit 340 is able to determine a region within the distance 91 from each point. Also, the output unit 350 is able to associate information indicating a region that includes these regions with the three-dimensional shape information. The output unit 350 is also able to assign a texture such as described above to a mesh model generated based on the point cloud data. Note that a configuration may be adopted in which the output unit 350 does not output the three-dimensional shape information of the object and the information indicating the image quality of the object in association with each other. For example, the output unit 350 may separately output information that associates the three-dimensional shape information of the object and the information indicating the image quality of the object. Also, the output unit 350 may output the three-dimensional shape information of the object and the information indicating the image quality of the object at different timings. For example, information that associates the three-dimensional shape information of the object and the information indicating the image quality of the object may be a time code.

A method of assigning a text or a shape as information indicating image quality has been described above. Additionally, the information processing apparatus 100 can possess a function to generate a virtual viewpoint video from a virtual viewpoint using three-dimensional model assigned with the information indicating the image quality (for example, the quality evaluation value or the texture explained above). In such an embodiment, the information processing apparatus can have a virtual viewpoint acquisition unit that acquires a designation of the virtual viewpoint and a virtual viewpoint video generation unit that generates a high-resolution virtual viewpoint video from the designated virtual viewpoint.

In such an embodiment, the output unit 350 of the information processing apparatus 100 sends the three-dimensional model assigned with the information indicating the image quality to an external apparatus (for example, the input device 50) which designates the virtual viewpoint. The external apparatus determines the virtual viewpoint, for the high-resolution video to be generated, using the three-dimensional model assigned with the information indicating the image quality, and sends virtual viewpoint information designating the determined virtual viewpoint to the virtual viewpoint acquisition unit. The virtual viewpoint acquisition unit acquires the virtual viewpoint information generated by the external apparatus and supplies this information to the virtual viewpoint video generation unit. The virtual viewpoint video generation unit generates a high-resolution virtual viewpoint video from the designated virtual viewpoint in accordance with the viewpoint-dependent rendering method as described above. Nevertheless, the virtual viewpoint video generation unit can employ any video generation methods to generate the high-resolution virtual viewpoint video from the virtual viewpoint designated using the information indicating the image quality.

Furthermore, the shape acquisition unit 310 of the information processing apparatus 100 may acquire three-dimensional shape information with a high resolution, which is used to generate a virtual viewpoint image or a virtual viewpoint video. As described above, the information processing apparatus 100 may send a first three-dimensional model assigned with the information indicating the image quality to the external device. This first three-dimensional model is used by the external device to determine the virtual viewpoint. At the same time, the information processing apparatus 100 may acquire a second three-dimensional model with a higher resolution than the first three-dimensional model. For example, the shape acquisition unit 310 may generate the first three-dimensional model using the smaller number of captured images and generate the second three-dimensional model using the larger number of captured images. Furthermore, the shape acquisition unit 310 may generate the second three-dimensional model by refining the first three-dimensional model. The second three-dimensional model is used to generate the virtual viewpoint image or the virtual viewpoint video (for example, to perform the viewpoint-dependent rendering method as described above). In such configurations, it is possible to shorten a time required to generate the first three-dimensional model. In addition, the processing to generate the second three-dimensional model can be performed while the external device determines the virtual viewpoint. Thus, it is possible to improve the quality of the virtual viewpoint image or the virtual viewpoint video with a shorter time.

The information processing apparatus 100 has been described above as part of the image generation system 1. However, the information processing apparatus 100 may be a stand-alone device separate from the image generation system 1. Also, a device for designating virtual viewpoints such as the input device 50 may have the functions of the information processing apparatus 100. For example, the input device 50 may have the processing units shown in FIG. 3. In this case, the input device 50 may display information (e.g., textures or semitranslucent model) indicating the image quality of the object generated by the generation unit 340 to the user. The input device 50 may also determine whether the image quality is secured in the virtual viewpoint image from the designated virtual viewpoint, in accordance with the information indicating the image quality of the object generated by the generation unit 340, and notify the determination result to the user.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-182798, filed Nov. 15, 2022, and Japanese Patent Application No. 2023-186954, filed Oct. 31, 2023, which are hereby incorporated by reference herein in their entirety.

What is claimed is:

1. An information processing apparatus comprising one or more memories storing instructions and one or more processors that execute the instructions to:
   acquire three-dimensional shape information indicating a three-dimensional shape of an object, wherein the three-dimensional shape information is for generating a virtual viewpoint image of the object, wherein the three-dimensional shape information has been generated by estimating the three-dimensional shape of the object based on a captured image of the object captured by an image capturing apparatus;
   evaluate image quality of each of a plurality of positions of the object in a captured image of the object captured by the image capturing apparatus; and
   output information indicating the image quality of the plurality of positions of the object respectively in association with the plurality of positions of the three-dimensional shape of the object indicated by the three-dimensional shape information of the object.

2. The information processing apparatus according to claim 1, wherein the one or more processors execute the instructions to output visualized information indicating the image quality of the object.

3. The information processing apparatus according to claim 1, wherein the one or more processors execute the instructions to output information representing a three-dimensional model that is based on the information indicating the image quality of the object.

4. The information processing apparatus according to claim 1, wherein the information indicating the image quality of the object is texture information indicating a texture of the three-dimensional model.

5. The information processing apparatus according to claim 4, wherein the texture includes repetition of an element, and a size of the element is selected according to the image quality of the object.

6. The information processing apparatus according to claim 4, wherein the one or more processors execute the instructions to output three-dimensional shape information indicating the three-dimensional shape of the object and a texture assigned to each of the plurality of positions of the three-dimensional shape of the object,
wherein the texture assigned to a specific position of the three-dimensional shape of the object is determined based on an image quality at the specific position in the captured image of the object obtained by the image capturing apparatus.

7. The information processing apparatus according to claim 1, wherein the one or more processors execute the instructions to:
output region information indicating a region set around the three-dimensional shape of the object as the information indicating the image quality of the object,
wherein the size of the region is set according to the image quality of the object.

8. The information processing apparatus according to claim 7, wherein the size of the region is set according to a focal length of a virtual viewpoint corresponding to the virtual viewpoint image.

9. The information processing apparatus according to claim 7, wherein the region set around the three-dimensional shape of the object includes the respective regions set around a plurality of positions of the three-dimensional shape of the object, and
wherein the region set around a specific position of the three-dimensional shape of the object is set based on information indicating image quality at the specific position in the captured image of the object obtained by the image capturing apparatus.

10. The information processing apparatus according to claim 7, wherein the one or more processors execute the instructions to
output three-dimensional shape information indicating the three-dimensional shape of the object and a three-dimensional shape indicating the region set around the three-dimensional shape of the object.

11. The information processing apparatus according to claim 1, wherein the one or more processors execute the instructions to evaluate the image quality of the object based on angle-of-view information indicating an angle of view of the image capturing apparatus.

12. The information processing apparatus according to claim 1, wherein the one or more processors execute the instructions to evaluate the image quality of the object based on resolution of the object in the captured image of the object obtained by the image capturing apparatus.

13. The information processing apparatus according to claim 1, wherein the one or more processors execute the instructions to evaluate image quality of a specific position of the object based on a captured image of the object obtained by an image capturing apparatus selected from a plurality of image capturing apparatuses, wherein the specific position of the object is visible from the selected image capturing apparatus.

14. The information processing apparatus according to claim 1, wherein the one or more processors execute the instructions to generate the three-dimensional shape information by estimating the three-dimensional shape of the object based on the captured image of the object.

15. The information processing apparatus according to claim 1, wherein the one or more processors execute the instructions to:
cause a display device to display the three-dimensional shape of the object that conforms to the three-dimensional shape information, and information indicating the image quality of the object; and
receive designation of a virtual viewpoint corresponding to the virtual viewpoint image from a user,
wherein the virtual viewpoint image is generated based on the captured image of the object, the three-dimensional shape information, and a designated virtual viewpoint.

16. An information processing apparatus comprising one or more memories storing instructions and one or more processors that execute the instructions to:
acquire three-dimensional shape information indicating a three-dimensional shape of an object, wherein the three-dimensional shape information is for generating a virtual viewpoint image of the object, wherein the three-dimensional shape information has been generated by estimating the three-dimensional shape of the object based on a captured image of the object captured by an image capturing apparatus;
determine respective textures for respective positions of a plurality of positions of the three-dimensional shape of the object indicated by the three-dimensional shape information, the texture for a specific position of the three-dimensional shape of the object being determined in accordance with image quality of the specific position of the object in a captured image of the object captured by the image capturing apparatus; and
assign the respective textures to the respective positions of the plurality of positions of the three-dimensional shape of the object indicated by the three-dimensional shape information.

17. An information processing apparatus comprising one or more memories storing instructions and one or more processors that execute the instructions to:
acquire three-dimensional shape information indicating a three-dimensional shape of an object, wherein the three-dimensional shape information has been generated by estimating the three-dimensional shape of the object based on a captured image of the object captured by an image capturing apparatus; and
generate region information, wherein the region information indicates regions within respective distances from respective positions of a plurality of positions of the three-dimensional shape of the object indicated by the three-dimensional shape information, the distances being set based on image quality of respective positions of the plurality of positions of the object in a captured image of the object captured by the image capturing apparatus.

18. An information processing method comprising:
acquiring three-dimensional shape information indicating a three-dimensional shape of an object, wherein the three-dimensional shape information is for generating a virtual viewpoint image of the object, wherein the three-dimensional shape information has been generated by estimating the three-dimensional shape of the object based on a captured image of the object captured by an image capturing apparatus;
evaluating image quality of each of a plurality of positions of the object in a captured image of the object captured by the image capturing apparatus; and
outputting information indicating the image quality of each of the plurality of positions of the object respectively in association with the plurality of positions of the three-dimensional shape of the object indicated by the three-dimensional shape information of the object.

19. A non-transitory computer-readable medium storing a program executable by a computer to perform a method comprising:
- acquiring three-dimensional shape information indicating a three-dimensional shape of an object, wherein the three-dimensional shape information is for generating a virtual viewpoint image of the object, wherein the three-dimensional shape information has been generated by estimating the three-dimensional shape of the object based on a captured image of the object captured by an image capturing apparatus;
- evaluating image quality of each of a plurality of positions of the object in a captured image of the object captured by the image capturing apparatus; and
- outputting information indicating the image quality of each of the plurality of positions of the object respectively in association with the plurality of positions of the three-dimensional shape of the object indicated by the three-dimensional shape information of the object.

* * * * *